US012554997B2

(12) United States Patent
Wang et al.

(10) Patent No.: US 12,554,997 B2
(45) Date of Patent: Feb. 17, 2026

(54) DEEP MULTI-VIEW NETWORK EMBEDDING ON INCOMPLETE DATA

(71) Applicant: Google LLC, Mountain View, CA (US)

(72) Inventors: Qifan Wang, Sunnyvale, CA (US); Ruining He, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1322 days.

(21) Appl. No.: 17/154,123

(22) Filed: Jan. 21, 2021

(65) Prior Publication Data

US 2021/0224352 A1 Jul. 22, 2021

Related U.S. Application Data

(60) Provisional application No. 62/963,756, filed on Jan. 21, 2020.

(51) Int. Cl.
| | |
|---|---|
| *G06N 5/022* | (2023.01) |
| *G06F 17/16* | (2006.01) |
| *G06N 3/02* | (2006.01) |
| *G06N 3/045* | (2023.01) |
| *G06N 3/0455* | (2023.01) |
| *G06N 3/0495* | (2023.01) |
| *G06N 3/0499* | (2023.01) |
| *G06N 3/084* | (2023.01) |

(Continued)

(52) U.S. Cl.
CPC ............ *G06N 5/022* (2013.01); *G06F 17/16* (2013.01); *G06N 3/02* (2013.01); *G06N 20/00* (2019.01); *H04L 41/12* (2013.01)

(58) Field of Classification Search
None
See application file for complete search history.

(56) References Cited

U.S. PATENT DOCUMENTS

| 10,997,219 B1* | 5/2021 | Han | G06F 16/285 |
|---|---|---|---|
| 11,562,226 B2* | 1/2023 | Saito | G16C 20/70 |

(Continued)

OTHER PUBLICATIONS

Wang et al., MGAE: Marginalized Graph Autoencoder for Graph Clustering, Nov. 6, 2017 (Year: 2017).*

(Continued)

*Primary Examiner* — Kamran Afshar
*Assistant Examiner* — Steven Phung
(74) *Attorney, Agent, or Firm* — DORITY & MANNING, P.A.

(57) ABSTRACT

A computing system can obtain a plurality of datasets that respectively correspond to a plurality of views of a graph network comprising a plurality of nodes, wherein the plurality of datasets comprise one or more partial view datasets for one or more partial views that comprise data for only a respective subset of the plurality of nodes of the graph network. The computing system can determine, based at least in part on an objective function, a plurality of respective embeddings associated respectively with the plurality of nodes, such as a common embedding set that contains respective embeddings for a common subset of the plurality of nodes that are common among all of the plurality of views, and one or more independent embedding sets that contain respective embeddings for one or more respective subsets of the plurality of nodes described only by a subset of the plurality of views.

20 Claims, 4 Drawing Sheets

View 1

View 2
Sort Into Embedding Sets and Then Jointly Optimize All Sets

View 3

Common Embedding Set:
Node 2 is Seen by All Views

Independent Embedding Set 1:
Nodes 1 and 4 are Seen by Views 1 and 2 Only

Independent Embedding Set 2:
Node 3 is Seen by Views 2 and 3 Only

Independent Embedding Set 3:
Node 5 is Seen by Views 1 and 3 Only

Independent Embedding Set 4:
Node 6 is Seen by View 3 Only

(51) Int. Cl.
  *G06N 20/00* (2019.01)
  *H04L 41/12* (2022.01)
  *H04L 41/16* (2022.01)

(56) References Cited

U.S. PATENT DOCUMENTS

2016/0246919 A1* 8/2016 Wang ............... G06Q 10/04
2019/0303857 A1* 10/2019 Lecue ............... G06F 16/29

OTHER PUBLICATIONS

Zhang et al., Multi-view Knowledge Graph Embedding for Entity Alignment, Jun. 30, 2013 (Year: 2013).*
Rai et al., Partial Multi-view Clustering Using Graph Regularized NMF, Apr. 24, 2016 (Year: 2016).*
Xu et al., "Adversarial Incomplete Multi-view Clustering", Aug. 10, 2019, IJCAI, vol. 7, pp. 3933-3939. (Year: 2019).*
Wen et al., "Unified Embedding Alignment with Missing Views Inferring for Incomplete Multi-View Clustering", Jul. 17, 2019, Proceedings of the AAAI Conference on Artificial Intelligence, vol. 33 No. 01, pp. 5393-5400. (Year: 2019).*
Ou et al., "Asymmetric Transitivity Preserving Graph Embedding", Aug. 13, 2016, Proceedings of the 22nd ACM SIGKDD International Conference on Knowledge Discovery and Data Mining, pp. 1105-1114. (Year: 2016).*
Ma et al., "Multi-view Clustering with Graph Embedding for Connectome Analysis", Nov. 6, 2017, Proceedings of the 2017 ACM on Conference on Information and Knowledge Management, pp. 127-136. (Year: 2017).*
Armandpour et al., "Robust Negative Sampling for Network Embedding", 33rd AAAI Conference on Artificial Intelligence, Jan. 27-Feb. 1, 2019, Honolulu, Hawaii, pp. 3191-2198.
Belkin et al., "Laplacian Eigenmaps and Spectral Techniques for Embedding and Clustering", Neural Information Processing Systems: Natural and Synthetic, Dec. 3-8, 2001, Vancouver, British Columbia, Canada, pp. 585-591.
Bhagat et al., "Node Classification in Social Networks", arXiv:1101.3291v1, Jan. 17, 2011, 37 pages.
Bui et al., "Labeling Actors in Multi-view Social Networks by Integrating Information From Within and Across Multiple Views", IEEE International Conference on Big Data, Dec. 5-8, 2016, Washington, D.C., 10 pages.
Cavallari et al., "Learning Community Embedding with Community Detection and Node Embedding on Graphs", International Conference on Information and Knowledge Management (CIKM), Nov. 6-10, 2017, Pan Pacific, Singapore, pp. 377-386.
Du et al., "Galaxy Network Embedding: A Hierarchical Community Structure Preserving Approach", International Joint Conference (IJCAI), Jul. 13-19, 2018, Sweden, Stockholm, pp. 2079-2085.
Gao et al., "Deep Attributed Network Embedding", International Joint Conference (IJCAI), Jul. 13-19, 2018, Sweden, Stockholm, pp. 3364-3370.
Gao et al., "ProGAN: Network Embedding via Proximity Generative Adversarial Network", 26th SIGKDD Conference on Knowledge Discovery and Data Mining, Aug. 4-8, 2019, Anchorage, Alaska, pp. 1308-1316.
Gong et al., "Iterative Quantization: A Procrustean Approach to Learning Binary Codes for Large-scale Image Retrieval", IEEE Transaction on Pattern Analysis and Machine Intelligence, vol. 35, No. 12, 2013, 15 pages.
Grover et al., "node2vec: Scalable Feature Learning for Networks", ACM SIGKDD Conference on Knowledge, Discovery and Data Mining, Aug. 13-17, 2016, San Francisco, CA, 10 pages.
Guo et al., "Anchors Bring Ease: An Embarrassingly Simple Approach to Partial Multi-View Clustering", Thirty-Third AAAI Conference on Artificial Intelligence (AAAI-19), Jan. 27-Feb. 1, 2019, Honolulu, Hawaii, pp. 118-125.

Hamilton et al., "Inductive Representation Learning on Large Graphs", 31st Conference on Neural Information Processing Systems (NIPS 2017), Dec. 4-9, 2017, Long Beach, CA, 11 pages.
Jin et al., "Incorporating Network Embedding into Markov Random Field for Better Community Detection", Thirty Third AAAI Conference on Artificial Intelligence (AAAI-19), Jan. 27-Feb. 1, 2019, Honolulu, Hawaii, pp. 160-167.
Li et al., "Learning Network Embedding with Community Structural Information", Twenty Eighth International Joint Conference on Artificial Intelligence (IJCAI-19), Aug. 10-16, 2019, Macao, China, pp. 2937-2943.
Li et al., "Partial Multi-View Clustering", Twenty Eighth AAAI Conference on Artificial Intelligence, Jul. 27-31, 2014, Quebec City, Quebec, Canada, pp. 1968-1974.
Liben-Nowell et al., "The Link-Prediction Problem for Social Networks", Journal of the American Society for Information Science and Technology, vol. 58, No. 7, May 2007. 23 pages.
Memisevic, "On Multi-view feature learning", 29th International Conference on Machine Learning, Jun. 26-Jul. 1, 2012, Edinburgh, Scotland, 8 pages.
Perozzi et al., "DeepWalk: Online Learning of Social Representations" arXiv:1403.6652v2, Jun. 27, 2014, 10 pages.
Qu et al., "An Attention-based Collaboration Framework for Multi-View Network Representation Learning", arXiv:1709.06636v1, Sep. 19, 2017, 10 pages.
Shi et al., "mvn2vec: Preservation and Collaboration in Multi-View Network Embedding", arXiv:1801.06597v2, Oct. 30, 2018, 10 pages.
Sun et al., "Megan: A Generative Adversarial Network for Multi-View Network Embedding", Twenty-Eighth International Joint Conference on Artificial Intelligence (IJCAI-19), Aug. 10-16, 2019, Macao, China, 7 pages.
Tang et al., "LINE: Large-scale Information Network Embedding", International Word Wide Web Conference, May 18-22, 2015, Florence, Italy, pp. 1067-1077.
Tu et al., "Deep Recursive Network Embedding with Regular Equivalence", ACM SIGKDD Conference on Knowledge Discover and Data Mining. Aug. 19-23, 2018, London, UK, pp. 2357-2366.
Wang et al., "Structural Deep Network Embedding", ACM SIGKDD Conference on Knowledge Discovery and Data Mining, Aug. 13-17, 2016, San Francisco, CA, 10 pages.
Wang et al., "A Survey on Learning to Hash", arXiv:1606.00185v2, Apr. 22, 2017, 21 pages.
Wang et al., "GraphGAN: Graph Representation Learning with Generative Adversarial Nets", Thirty-Second AAAI Conference on Artificial Intelligence, Feb. 2-7, 2018, New Orleans, Louisiana, pp. 2508-2515.
Wang et al., "Learning to Hash on Partial Multi-Modal Data", Twenty-Fourth International Joint Conference on Artificial Intelligence (IJCAI 2015), Jul. 25-31, 2015, Buenos Aires, Argentina, pp. 3904-3910.
Wang et al., "Linked Document Embedding for Classification", Conference on Information and Knowledge Management (CIKM), Oct. 24-28, 2016, Indianapolis, Indiana, 10 pages.
Wang et al., "On Deep Multi-View Representation Learning", 32nd International Conference on Machine Learning, Jul. 6-11, 2015, Lille, France, 10 pages.
White et al., "Convex Multi-view Subspace Learning", Twenty-sixth Conference on Neural Information Processing Systems, Dec. 3-8, Lake Tahoe, Nevada, 14 pages.
Wu et al., "Efficient Attributed Network Embedding via Recursive Randomized Hashing", Twenty-Seventh International Joint Conference on Artificial Intelligence (IJCAI-18), Jul. 13-19, 2018, Stockholm, Sweden, pp. 2861-2867.
Zhang et al., "COSINE: Community-Preserving Social Network Embedding from Information Diffusion Cascades", Thirty-Second AAAI Conference on Artificial Intelligence (AAAI-18), Feb. 2-7, 2018, New Orleans, Louisiana, pp. 2620-2627.
Zhang et al., "DANE: Domain Adaptive Network Embedding", Twenty Eighth International Joint Conference on Artificial Intelligence (IJCAI-19), Aug. 10-16, 2019, Macao, China, pp. 4362-4368.

(56) References Cited

OTHER PUBLICATIONS

Zhang et al., "Diffusion Maps for Textual Network Embedding", Thirty-Second Conference on Neural Information Processing Systems, Dec. 2-8, 2018, Montreal, Canada, 11 pages.

Zhang et al., "Scalable Multiplex Network Embedding", Twenty-Seventh International Joint Conference on Artificial Intelligence (IJCAI-18), Jul. 13-19, 2018, Stockholm, Sweden, pp. 3082-3088.

Zhang et al., "SINE: Scalable Incomplete Network Embedding", arXiv:1810.06768v1, Oct. 16, 2018, 10 pages.

* cited by examiner

DEEP MULTI-VIEW NETWORK EMBEDDING ON INCOMPLETE DATA

RELATED APPLICATIONS

This application claims priority to and the benefit of U.S. Provisional Patent Application No. 62/963,756, which is hereby incorporated by reference in its entirety.

FIELD

The present disclosure relates generally to graph networks. More particularly, the present disclosure relates to generating a unified embedding for the nodes a graph network from partial multi-view data descriptive of the network.

BACKGROUND

Network embedding is an effective technique to learn the low-dimensional representations of nodes in networks. Real-world data are usually with multiple modalities or having multi-view representations from different sources. Recently, there has been increasing interest in network embedding on multi-view data. However, most existing multi-view approaches assume that each node appears in all views, or at least there is one view containing all nodes. But in real applications, it is often the case that a view suffers from the missing of some data and therefore results in partial multi-view data.

In particular, network embedding is often designed for learning low-dimensional and typically non-linear representations of nodes in the network, which is able to preserve network information. Network embedding has been shown to be useful in many downstream tasks, such as node classification, node clustering, link prediction, and community detection. A variety of network embedding techniques have been proposed in the literature. However, most of these methods focus on single-view networks, where nodes in the networks are only associated with one type of features or relationships.

In many real-world applications, data usually have multi-view representations, where nodes are associated with multiple features from different sources. Multiple types of edges/relations are then generated from these disparate features. For example, in document corpus, a document has hyperlink feature that connects to other related documents. It can also have semantic representation such as attribute or tag feature. Documents are linked together in the attribute view if they share at least one attribute. In a social photo-sharing application, users can be represented with their friendship to others, public comments, photos, reviews, tags, etc. Similarly, users can be linked in the photo network or tag network if they share same photos or tags.

Previous research on multi-view representation learning has demonstrated improved performance by leveraging complementary information from different views. Therefore, there is a growing interest in multi-view network embedding that effectively integrates information from disparate views.

Although existing multi-view network embedding methods generate promising results in dealing with multi-view data, most of them assume that all nodes in the network have full information in all views. However, in real-world tasks, it is often the case that a view suffers from some missing information, which results in incomplete data. For instance, in document corpus, many documents may not contain any hyperlink or tag information. In a social photo-sharing application, a user might have no friends, reviews or tags, resulting in an isolated node in the corresponding relationship network. Moreover, it is also common that users do not share some of their information, such as photos and comments, for privacy consideration. Therefore, it is a practical and important research problem to design effective network embedding methods on incomplete multi-view data.

There are several ways to apply existing multi-view network embedding methods to incomplete data. One can either remove the data that suffer from missing information or preprocess the partial data by first filling in the missing data. The first strategy is clearly not suitable since the purpose is to map all nodes to their corresponding embedding vectors and empirical experiments show that the second strategy does not achieve good performance either.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to generate embeddings from partial view data. The method can include obtaining, by one or more computing devices, a plurality of datasets that respectively correspond to a plurality of views of a graph network comprising a plurality of nodes. In some implementations, the plurality of datasets comprise one or more partial view datasets for one or more partial views that comprise data for only a respective subset of the plurality of nodes of the graph network. The method can include defining, by the one or more computing devices, a unified embedding for the plurality of nodes, wherein the unified embedding comprises: a common embedding set that contains respective embeddings for common subset of the plurality of nodes that are common among all of plurality of views; and one or more independent embedding sets that contain respective embeddings for one or more respective independent subsets of the plurality of nodes that are described by only a respective subset of the plurality of views. The method can include processing, by the one or more computing devices, each of the plurality of datasets with an encoder model to obtain, for each of the plurality of datasets, respective encoded representations of the plurality of nodes described by the corresponding view. The method can include modifying, by the one or more computing devices, the respective embeddings for one or more of the plurality of nodes to reduce an objective function that, for each of the plurality of views, performs a comparison of the respective encoded representations of the plurality of nodes described by such view with the respective embeddings for the nodes described by such view. In some implementations, for at least one of the plurality of views, the comparison is performed using a respective embedding matrix that comprises separate respective entries for the common embedding set and at least one of the one or more independent embedding sets.

In some implementations, the one or more independent embedding sets can include a plurality of independent embedding sets.

In some implementations, at least one of the one or more independent embedding sets can contain respective embeddings for a respective independent subset of the plurality of nodes that is described by only a single view.

In some implementations, at least one of the one or more independent embedding sets can contain respective embeddings for a respective independent subset of the plurality of nodes that is described by two or more but not all of plurality of views.

In some implementations, for the at least one of the plurality of views, the respective embedding matrix can consist of a first entry for the common embedding set and a second entry for a respective independent subset of the plurality of nodes that are described by only such view.

In some implementations, the method can further include modifying, by the one or more computing devices, one or more parameter values of the encoder model to reduce the objective function.

In some implementations, said modifying the respective embeddings for one or more of the plurality of nodes to reduce the objective function can include minimizing the objective function.

The computer-implemented method of claim 1, wherein the objective function further comprises a proximity preservation term that enforces preservation of proximity within each view.

In some implementations, the objective function evaluates, for each of the plurality of views, the respective difference between the respective encoded representations of the plurality of nodes obtained for such view and the respective embeddings for the nodes described by such view multiplied by a respective basis matrix for such view.

In some implementations, the objective function evaluates, for each of the plurality of views, a Frobenius norm of the respective difference between the respective encoded representations of the plurality of nodes obtained for such view and the respective embeddings for the nodes described by such view multiplied by a respective basis matrix for such view.

In some implementations, the objective function comprises a sum of respective distances evaluated for the plurality of views.

In some implementations, at least two of the plurality of datasets comprise different respective modalities of data.

Another example aspect of the present disclosure is directed to a computing system, comprising one or more processors and one or more non-transitory computer-readable media that collectively store instructions that when executed by the one or more processors cause the computing system to perform operations. The operations can include obtaining a unified embedding for a graph network comprising a plurality of nodes. The operations can include analyzing one or more of the plurality of nodes or the graph network based on the unified embedding.

In some implementations, the graph network comprises a social network that describes social connections between entities, a logistics network that describes logistical connections between logistical nodes, a biological network that describes biological units, or a chemical network that describes chemical units.

In some implementations, analyzing one or more of the plurality of nodes based on the unified embedding can include: using the respective embedding for a first node of the plurality of nodes to: identify one or more other nodes of the plurality of nodes that are similar to the first node; classify the first node; predict a link between the first node and at least one other node of the plurality of nodes; cluster the first node with one or more other nodes; and/or identify a community to which the first node belongs.

In some implementations, the unified embedding was generated by a second, different computing system that is distinct from the computing system.

In some implementations, the unified embedding was generated by same the computing system.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1A:
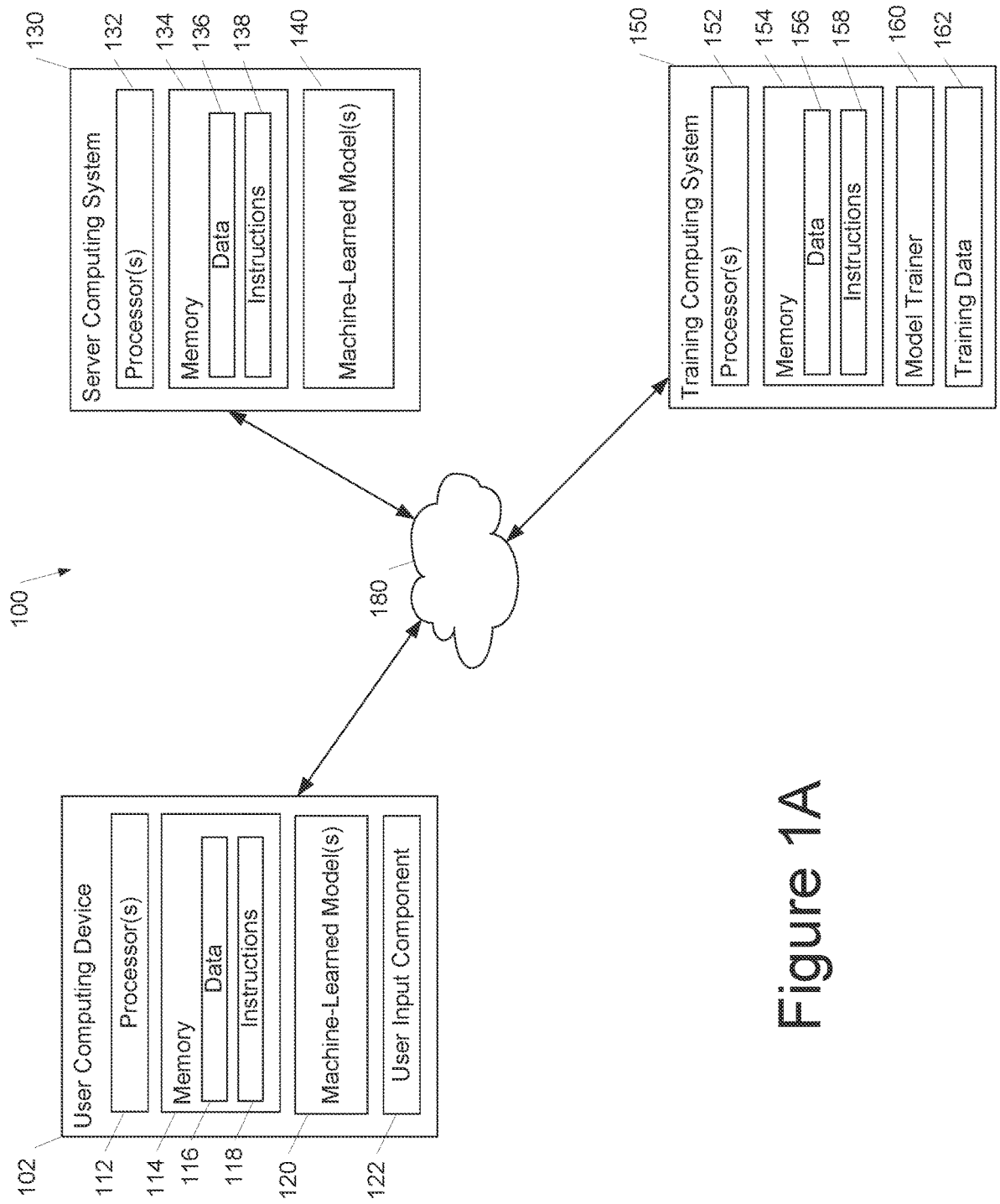
FIG. 1A depicts a block diagram of an example computing system according to example embodiments of the present disclosure.

The present disclosure provides a novel Deep Partial Multiview Network Embedding approach to deal with incomplete data. In particular, the network embeddings can be learned by simultaneously enforcing the data consistency between different views via deep latent subspace learning and preserving the data topological structure within the same view through graph Laplacian.

More particularly, the present disclosure provides a unified learning framework that enables learning of the network embedding. Example implementations of the framework simultaneously enforce the data consistency between different views via deep latent subspace learning and preserve data proximity within the same view through graph Laplacian. A coordinate descent algorithm can be applied as the optimization procedure.

The proposed framework can also be applied to hashing methods based on the orthogonal invariant property of example proposed formulations. Example experiments on two datasets have demonstrated the advantages of the proposed approach over several state-of-the-art single-view and multi-view network embedding methods.

Thus, one aspect of the present disclosure relates to a unified network embedding approach to deal with partial multi-view data scenario, which is able to generate effective embedding representations for all data. Another example aspect relates to a coordinate descent method for the joint optimization problem.

The systems and methods of the present disclosure provide a number of technical effects and benefits. As one example technical effect, the systems and methods of the present disclosure can enable improved classification results, thereby improving the performance of a computer or computerized system. As another example technical effect, the systems and methods of the present disclosure can enable improved handling of multi-partial-view datasets, which were heretofore not able to be handled by learning-based computer systems, thereby improving the performance of a computer or computerized system.

Example Deep Partial Multi-View Network Embedding
Example Problem Definition

While any number of views can be accommodated, for the sake of simplicity only, the following explanation will assume there are data from two views, i.e., given a multi-view network $G=(V, E)$, where $V=\{v_1, v_2, \ldots, v_n\}$ denotes the set of nodes.

$$X = \{(x_i^1, x_i^2), i = 1, \ldots, n\}$$

are the multi-view features associated with the nodes, where $$x_i^1$$

$\in \mathbb{R}^{d_1}$ is the feature of the i-th node in the first view and $$x_i^2$$

$\in \mathbb{R}^{d_2}$ is the i-th node in the second view (usually $d_1 \neq d_2$). $E=\{E^1, E^2\}$ denotes the edge sets in the two views, where $$E_{i,j}^t = 1$$

indicates that $v_i$ and $v_j$ are linked in the t-th view.

In the incomplete data setting, a partial data $\hat{X}=\{\hat{X}^{(1,2)}, \hat{X}^{(1)}, \hat{X}^{(2)}\}$ instead of X is given, where $$\hat{X}^{(1,2)} = \{(x_1^1, x_1^2), \ldots, (x_c^1, x_c^2)\}$$

$\in \mathbb{R}^{c \times (d_1+d_2)}$ denotes the common nodes present in both views, $$\hat{X}^{(1)} = \{x_{c+1}^1, \ldots, x_{c+n_1}^1\}$$

$\in \mathbb{R}^{n_1 \times d_1}$ denotes the nodes only present in the first view and $$\hat{X}^{(2)} = \{x_{c+n_1+1}^2, \ldots, x_{c+n_1+n_2}^2\}$$

$\in \mathbb{R}^{n_2 \times d_2}$ denotes the nodes only present in the second view. Note that the number of nodes present and only present in both views, the first view, and the second view are c, $n_1$ and $n_2$ ($n=c+n_1+n_2$). One example purpose of Deep Partial Multi-View Network Embedding (DPMNE) is to learn a low-dimensional embedding representation $Y=\{y_1, y_2, \ldots, y_n\} \in \mathbb{R}^{n \times d}$ of G, where $d \ll d_1$ and $d_2$ is the latent embedding dimension.

An example objective function of DPMNE can be composed of two components: (1) Data consistency between views, where deep latent subspace learning is utilized to ensure that the node embeddings generated from different views are consistent. (2) Proximity preservation within view, where graph Laplacian is applied to enforce that similar nodes within each view should have close embeddings.

Example Data Consistency Between Views

To capture the sparsity and highly non-linear structure in the feature space, some example implementations adopt a deep encoder to map the input data to the representation space:

$$h_1 = \sigma(W_1 x + b_1) \quad (1)$$

$$h_k = \sigma(W_k h_{k-1} + b_k)$$

where $h_i$ is the hidden representation from the encoder. W and b are model parameters. $\sigma(\cdot)$ denotes the non-linear activation function. k is the index number of the layers.

In the partial data setting, $\hat{X}^{(1,2)}, \hat{X}^{(1)}, \hat{X}^{(2)}$ are represented by heterogeneous features of dimensions $(d_1+d_2)$, $d_1$, $d_2$, which makes it difficult for learning their embeddings. But investigating the problem from view perspective, in each individual view, the nodes are sharing the same feature space. The two different views are coupled/bridged by the shared common nodes. Some example implementations can learn a common latent subspace for the two views, where embeddings belonging to the same node between different views are consistent, while at the same time for each view, the representations for similar nodes are close in the latent subspace. Then the embeddings can be directly learned from this subspace, and some example implementations do not need to fill in or complete the partial data. Let $$\hat{X}^{(1,2)} = \left[\hat{X}_c^{(1)}, \hat{X}_c^{(2)}\right],$$

where $$\hat{X}_c^{(1)}$$

$\in \mathbb{R}^{c \times d_1}$, $$\hat{X}_c^{(2)}$$

$\in \mathbb{R}^{c \times d_2}$ are the instances of the common nodes coming from the two views. We denote the instances of each view as:

$$\overline{X}^{(1)} = \left[\hat{X}_c^{(1)}, \hat{X}^{(1)}\right]$$

$\in \mathbb{R}^{(c+n_1) \times d_1}$, $$\overline{X}^{(2)} = \left[ \hat{X}_c^{(2)}, \hat{X}^{(2)} \right]$$

$\in \mathbb{R}^{(c+n_2) \times d_2}$. Following the above idea, the deep latent subspace learning can be formulated as:

$$\min_{Y,B,H} \left\| H^{(1)}(\overline{X}^{(1)}) - \overline{Y}^{(1)} B^{(1)} \right\|_F^2 + \left\| H^{(2)}(\overline{X}^{(2)}) - \overline{Y}^{(2)} B^{(2)} \right\|_F^2 + \lambda \ R(Y, B, H) \quad (2)$$

where $B^{(1)} \in \mathbb{R}^{d \times d_1}$ and $B^{(2)} \in \mathbb{R}^{d \times d_2}$ are the basis matrix for each view's latent space.

$$\overline{Y}^{(1)} = \left[ \hat{Y}_c^{(1)}, \hat{Y}^{(1)} \right]$$

$\in \mathbb{R}^{(c+n_1) \times d}$ and $$\overline{Y}^{(2)} = \left[ \hat{Y}_c^{(2)}, \hat{Y}^{(2)} \right]$$

$\in \mathbb{R}^{(c+n_2) \times d}$ are the latent representation/embedding of nodes in the latent space. H are the encoders described in Eqn.1. The same latent space dimension d is shared between the two views.

$$R(\cdot) = \| \cdot \|_F^2$$

is the regularization term and $\lambda$ is the trade-off parameter. By solving Eqn.2, the deep encoder H, the latent space basis B and corresponding node embedding Y can be simultaneously learned to minimize the reconstruction error from each individual view.

In the above equation, the latent space are learned independently for each view. But in the partial data setting, for nodes present in both views $$\hat{X}_c^{(1)}, \hat{X}_c^{(2)},$$

their embedding $$\hat{Y}_c^{(1)}, \hat{Y}_c^{(2)}$$

should also be consistent. Incorporating the above formulations by ensuring $$\hat{Y}_c^{(1)} = \hat{Y}_c^{(2)} = \hat{Y}_c,$$

we seek to minimize:

$$\min_{Y,B,H} \left\| H^{(1)} \begin{bmatrix} \hat{X}_c^{(1)} \\ \hat{X}^{(1)} \end{bmatrix} - \begin{bmatrix} \hat{Y}_c \\ \hat{Y}^{(1)} \end{bmatrix} B^{(1)} \right\|_F^2 + \quad (3)$$

$$\left\| H^{(2)} \begin{bmatrix} \hat{X}_c^{(2)} \\ \hat{X}^{(2)} \end{bmatrix} - \begin{bmatrix} \hat{Y}_c \\ \hat{Y}^{(2)} \end{bmatrix} B^{(2)} \right\|_F^2 + \lambda \ R(Y, B, H)$$

By solving the above problem, some example implementations can obtain the homogeneous feature representation for all nodes as $$Y = \left[ \hat{Y}_c, \hat{Y}^{(1)}, \hat{Y}^{(2)} \right]$$

$\in \mathbb{R}^{(c+n_1+n_2) \times d}$, whether they are originally partial or not. Note that Eqn.3 is different from previous subspace based multi-view network embedding approaches, which either requires $\overline{Y}^{(1)}$ and $\overline{Y}^{(2)}$ to be the same or do not require $\overline{Y}^{(1)}$ and $\overline{Y}^{(2)}$ to share any common part. In the above formulation, $\overline{Y}^{(1)}$ and $\overline{Y}^{(2)}$ share one common representation $\hat{Y}_c$, while at the same time have their own individual components. Moreover, the individual basis matrix $B^{(1)}$ and $B^{(2)}$, which are learned from all available instances from both views, are connected by the common $\hat{Y}_c$.

Figure 2:
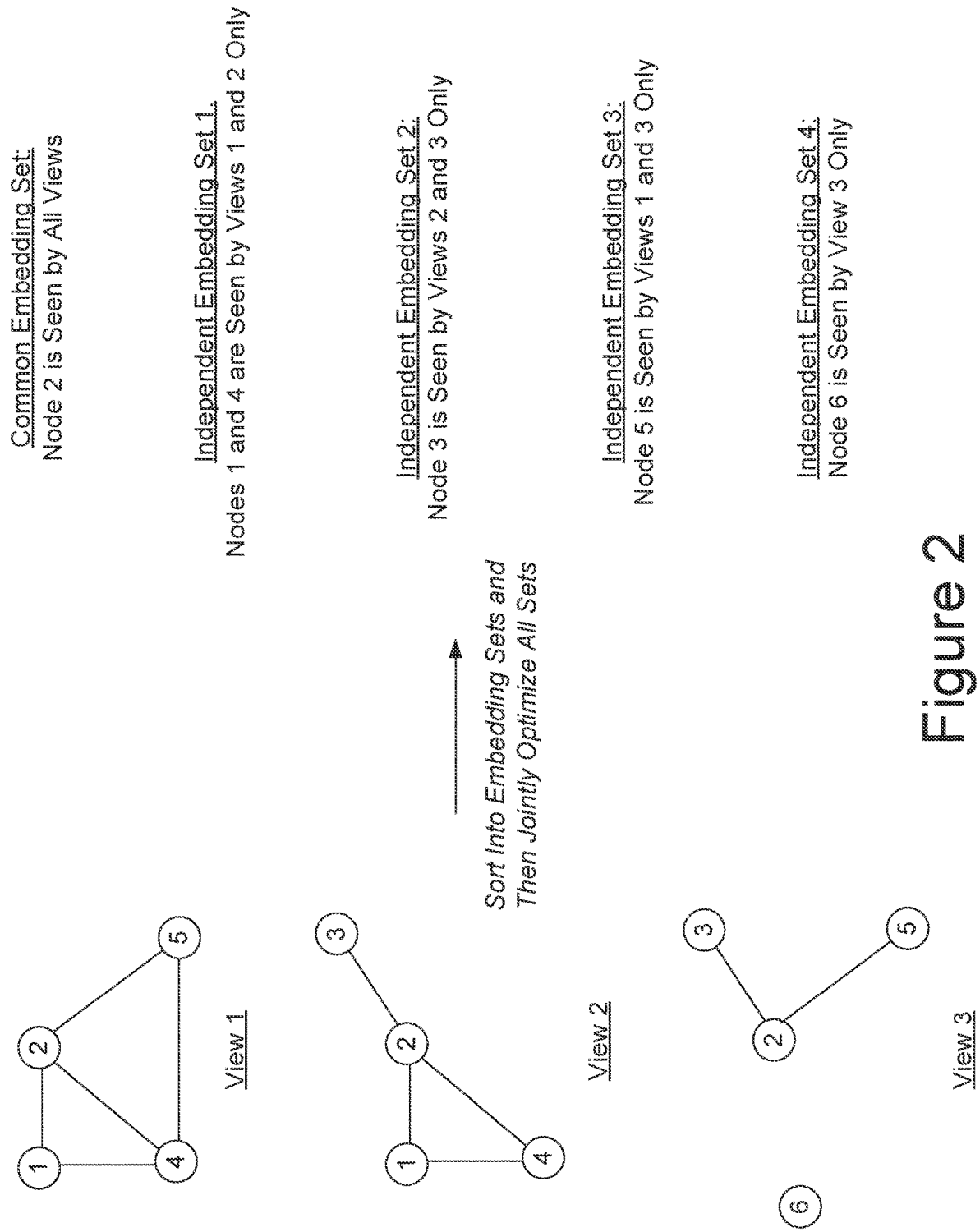
FIG. 2 depicts a graphical diagram of example embedding sets generated from multiple partial views of a graph network according to example embodiments of the present disclosure.

This principle can be applied to any number of shared nodes among any number of different views. As another example, FIG. 2 provides an illustration of example embedding sets generated from multiple partial views of a graph network.

Example Proximity Preservation within View

One of the key problems in network embedding algorithms is proximity preserving, which indicates that similar nodes should be mapped to similar embedding within a close distance. Therefore, besides the data consistency between different views, some example implementations also preserve the data proximity within each individual view. In other words, some example implementations cause the learned embedding Y to preserve the proximity structure in each view. As an example, some example implementations use the $L_2$ distance to measure the proximity between $y_i$ and $y_j$ as $\|y_i - y_j\|^2$ as in most network embedding work. Then one natural way to preserve the proximity in each view is to minimize the weighted average distance as follows:

$$\sum_{i,j} S_{ij}^{(t)} \|y_i - y_j\|^2 \quad t = 1, 2 \quad (4)$$

Here, $S^{(t)}$ is the proximity matrix in t-th view, which can be obtained from the edges in t-th network $E^{(t)}$. A simple way to define S is to directly use the first-order proximity, i.e., S=E. However, the first-order proximity is usually very sparse and insufficient to fully model the relationships between nodes in most cases, especially under the partial data setting. In order to characterize the connections between nodes better, some example implementations adopt high-order proximity and define S as:

$$S = w_1 E + w_2 E^2 + \ldots + w_l E^l \quad (5)$$

where l is the order, and $w_1, \ldots, w_l$ are the weights for each term. Some example implementations set l to 5, $w_1$ to 1 and $w_i = 0.5 w_{i-1}$.

Matrix $E^l$ denotes the l-order proximity matrix. To meet the proximity preservation criterion, some example implementations seek to minimize the quantity in Eqn.4 in each view since it incurs a heavy penalty if two similar nodes have very different embedding representations. By introducing a diagonal matrix $D^{(t)}$, whose entries are given by $$D_{ii}^{(t)} = \sum_{j=1}^{n} S_{ij}^{(t)}. \qquad \text{Eqn. 4}$$

can be rewritten as:

$$tr\left(\overline{Y}^{(t)^T}(D^{(t)} - S^{(t)})\overline{Y}^{(t)}\right) = tr\left(\overline{Y}^{(t)^T} L^{(t)} \overline{Y}^{(t)}\right) = 1, 2 \qquad (6)$$

where L is called graph Laplacian and tr(·) is the matrix trace function. By minimizing the above objective in both views, the proximity between different nodes can be preserved in the learned embedding.

Example Overall Objective and Optimization

Some example entire objective functions consist of two components: the data consistency between views in Eqn.3 and proximity preservation within view given in Eqn.6 as follows:

$$\min_{Y,B,H} O = \left\|\overline{H}^{(1)} - \overline{Y}^{(1)} B^{(1)}\right\|_F^2 + \left\|\overline{H}^{(2)} - \overline{Y}^{(2)} B^{(2)}\right\|_F^2 + \qquad (7)$$

$$\alpha\left(tr\left(\overline{Y}^{(1)^T} L^{(1)} \overline{Y}^{(1)}\right) + tr\left(\overline{Y}^{(2)^T} L^{(2)} \overline{Y}^{(2)}\right)\right) + \lambda R(Y, B, H)$$

where $\alpha$ and $\lambda$ are trade-off parameters to balance the weights among the terms. $\overline{H}^{(t)} = H^{(t)}(\overline{X}^{(t)})$ is the short representation of the encoded input in Eqn.1. Note that $\overline{Y}^{(1)}$ and $\overline{Y}^{(2)}$ share an identical part $\hat{Y}_c$ corresponding to the common nodes present in both views. Directly minimizing the objective function in Eqn.7 is intractable since it is a non-convex optimization problem with Y, B and H coupled together. We propose to use coordinate descent scheme by iteratively solving the optimization problem with respect to Y, B and H as follows:

(1) Update $\hat{Y}_c$, $\hat{Y}^{(1)}$ and $\hat{Y}^{(2)}$ by fixing B and H. Given the basis matrix $B^{(t)}$ and encoders $H^{(t)}$ for both views, we can decompose the objective since $\hat{Y}_c$ and $\hat{Y}^{(t)}$ will not depend on each other.

$$\min_{\hat{Y}^{(t)}} O(\hat{Y}^{(t)}) = \left\|\hat{H}^{(t)} - \hat{Y}^{(t)} B^{(t)}\right\|_F^2 + \alpha\, tr\left(\hat{Y}^{(t)^T} \hat{L}^{(t)} \hat{Y}^{(t)}\right) + \lambda R(\hat{Y}^{(t)}) + const \qquad (8)$$

$$\min_{\hat{Y}_c} O(\hat{Y}_c) = \left\|\hat{H}_c^{(1)} - \hat{Y}_c B^{(1)}\right\|_F^2 + \qquad (9)$$

$$\left\|\hat{H}_c^{(2)} - \hat{Y}_c B^{(2)}\right\|_F^2 + \alpha\, tr\left(\hat{Y}_c^T(\hat{L}_c^{(1)} + \hat{L}_c^{(2)})\hat{Y}_c\right) + \lambda R(\hat{Y}_c) + const$$

where $\hat{L}^{(t)}$ and $\hat{L}_c^{(t)}$ can be simply derived from $L^{(t)}$ with some addition mathematical operation. const is the constant value independent with the parameter that to be optimized with. Although Eqn.8 and Eqn.9 are still non-convex, they are smooth and differentiable which enables gradient descent methods for efficient optimization. We omit the gradients calculation due to space limitation.

(2) Update $B^{(t)}$ by fixing Y and H. It is equivalent to solve the following least square problems:

$$\min_{B^{(t)}} O(B^{(t)}) = \left\|H^{(t)} - \overline{Y}^{(t)} B^{(t)}\right\|_F^2 + \lambda \|B^{(t)}\|_F^2 \qquad (10)$$

By taking the derivative of Eqn.10 w.r.t. $B^{(t)}$ and setting it to 0, a closed form solution can be simply obtained.

(3) Update $H^{(t)}$ by fixing Y and B. It is a standard regression problem with deep neural network:

$$\min_{H^{(t)}} O(H^{(t)}) = \left\|H^{(t)}(\overline{X}^{(t)}) - \overline{Y}^{(t)} B^{(t)}\right\|_F^2 + \lambda R(H^{(t)}) \qquad (11)$$

Some example implementations then alternate the process of updating Y, B and H for several iterations to find a locally optimal solution. One example of a full learning algorithm is described in Algorithm 1:

Algorithm 1: Example Deep Partial Multi-View Network Embedding (DPMNE)
  Input: Partial data $\{\hat{X}^{(1,2)}, \hat{X}^{(1)}, \hat{X}^{(2)}\}$, edge sets $E^{(1)}$ and $E^{(2)}$, trade-off parameters $\alpha$ and $\lambda$
  Output: Unified embedding Y.
  Initialize B and H, Calculate L.
  repeat
    Optimize Eqns.8 and 9 and update $\hat{Y}_c$, $\hat{Y}^{(1)}$ and $\hat{Y}^{(2)}$.
    Optimize Eqn.10 and update $B^{(1)}$ and $B^{(2)}$.
    Optimize Eqn.11 and update $H^{(1)}$ and $H^{(2)}$.
  until the solution converges Example Extension to Hashing This section connects the techniques described elsewhere herein to example quantization-based hashing techniques. Example hashing methods learn compact binary representations of the data examples for efficient similarity search tasks. This section first proves the following orthogonal invariant property:

Theorem 1 Assume Q is a d×d orthogonal matrix, i.e., $Q^T Q = I_d$. If Y, B and H are an optimal solution to the problem in Eqn.7, then Y'=YQ, B'=$Q^T$B and H'=H are also an optimal solution.

Proof. By substituting YQ and $Q^T$B into Eqn.7, it is obvious that:

$$\left\|\overline{H}^{(t)} - \overline{Y}^{(t)} Q Q^T B^{(t)}\right\|_F^2 = \left\|\overline{H}^{(t)} - \overline{Y}^{(t)} B^{(t)}\right\|_F^2,$$

$$tr\left((\overline{Y}^{(t)} Q)^T L^{(t)} \overline{Y}^{(t)} Q\right) = tr\left(Q^T \overline{Y}^{(t)^T} L^{(t)} \overline{Y}^{(t)} Q\right) = tr\left(\overline{Y}^{(t)^T} L^{(t)} \overline{Y}^{(t)}\right),$$

and $$\|YQ\|_F^2 = \|Y\|_F^2, \quad \|Q^T B\|_F^2 = \|B\|_F^2.$$

Thus, the value of the objective function in Eqn.7 does not change by the orthogonal rotation.

Quantization-based hashing methods directly binarize the low-dimensional representation to achieve the binary codes. Some example implementations of the present disclosure can easily obtain the binary codes C for the nodes in the network by binarizing the learned embedding Y. However, the quantization error can be further reduced based on the orthogonal invariant property of the embedding, i.e., minimizing the quantization error between the binary hashing codes and the orthogonal rotation of the embedding as follows:

$$\min_{C,Q} \|C - YQ\|_F^2 \qquad (12)$$

-continued s.t. $C \in \{-1, 1\}^{n \times d}, Q^T Q = I_d$

Example Analysis

This section provides some complexity analysis on the training cost of example learning algorithms. One example optimization algorithm of DPMNE consists of three steps in each iteration to update Y, B and H. The time complexities for solving Y and B are bounded by $O(ndd_1+ndd_2+nd^2+n^2d)$ and $O(nd^2+ndd_1+ndd_2)$ respectively. In practice, L is usually a sparse matrix, and the cost can be reduced from $O(n^2d)$ to $O(ld)$ with sparse matrix multiplication, where l is the number of non-zero elements in L. The cost of updating H depends on the number of hidden layers and units in the neural network, which is roughly $O(nmd_1+nmd_2)$. Here m is the number of unique units in the neural network. Thus, the total time complexity of the learning algorithm is bounded by $O(ndd_1+ndd_2+ld+nd^2+nmd_1+nmd_2)$.

Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Additional example machine-learning models include self-attention-based models such as transformer models.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a network analysis service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Additional example machine-learning models include self-attention-based models such as transformer models.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, multiple partial or complete views of a network.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
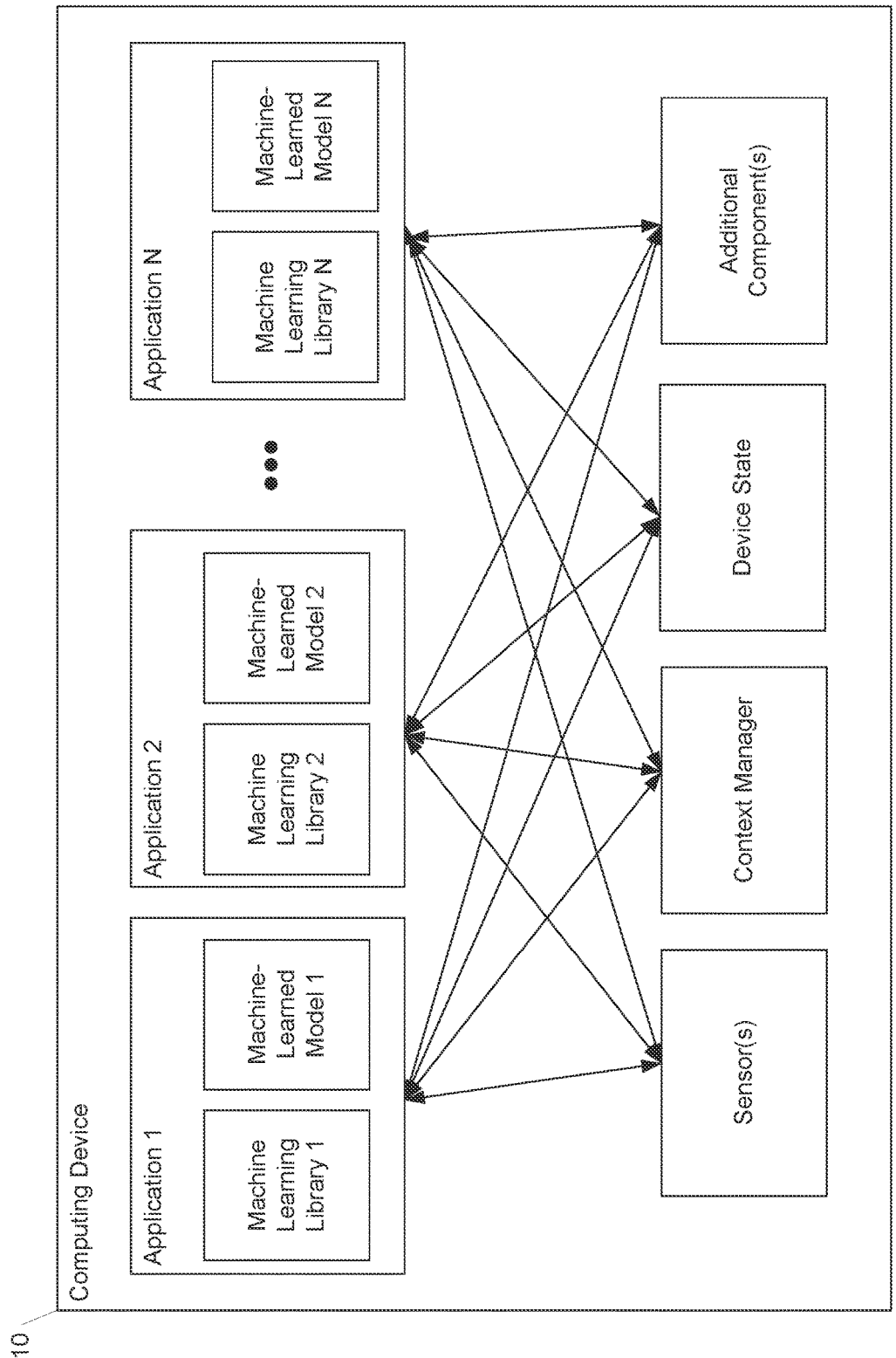
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
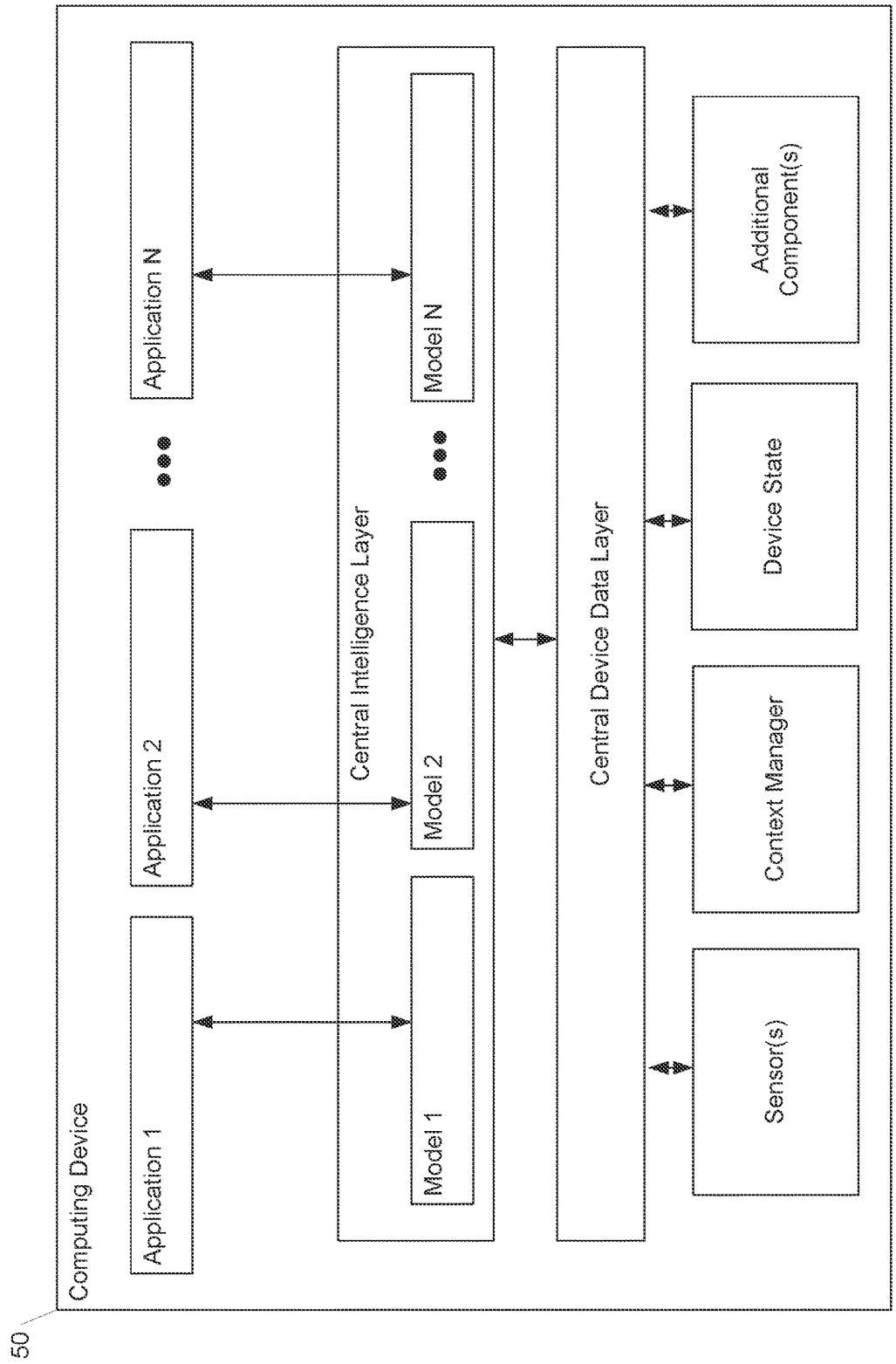
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to generate embeddings from partial view data, the method comprising:
   obtaining, by one or more computing devices, a plurality of datasets that respectively correspond to a plurality of views of a graph network comprising a plurality of nodes, wherein the plurality of datasets comprise one or more partial view datasets for one or more partial views that comprise data for only a respective subset of the plurality of nodes of the graph network;
   initializing, by the one or more computing devices:
      a common embedding set that contains respective embeddings for a common subset of the plurality of nodes that are common among all of the plurality of views; and
      one or more independent embedding sets that contain respective embeddings for one or more respective independent subsets of the plurality of nodes that are described by only a respective subset of the plurality of views;
   initializing, by the one or more computing devices for each respective view of the plurality of views, a view-specific basis matrix of a plurality of view-specific basis matrices and a view-specific encoder model of a plurality of view-specific encoder models; and
   updating the plurality of view-specific encoder models, the plurality of view-specific basis matrices, and the one or more independent embedding sets using a coordinate descent operation, wherein the coordinate descent operation comprises, for each of a plurality of iterations:
      processing, by the one or more computing devices, each of the plurality of datasets with a corresponding view-specific encoder model of the plurality of view-specific encoder models to obtain, for each of the plurality of datasets, respective encoded representations of the plurality of nodes described by the corresponding view;
      updating, by the one or more computing devices for each respective view of the plurality of views, based at least in part on an objective function, the view-specific encoder model;
      updating, by the one or more computing devices for each respective view of the plurality of views, based at least in part on the objective function, the view-specific basis matrix;
      updating, by the one or more computing devices, based at least in part on the objective function, the common embedding set; and
      updating, by the one or more computing devices, based at least in part on the objective function, the one or more respective independent embedding sets;
   wherein the objective function comprises a comparison of the respective encoded representations with the respective embeddings, and wherein the objective function further comprises a proximity preservation term that enforces preservation of proximity within each view.

2. The computer-implemented method of claim 1, wherein the one or more independent embedding sets comprise a plurality of independent embedding sets.

3. The computer-implemented method of claim 1, wherein at least one of the one or more independent embedding sets contains respective embeddings for a respective independent subset of the plurality of nodes that is described by only a single view.

4. The computer-implemented method of claim 1, wherein at least one of the one or more independent embedding sets contains respective embeddings for a respective independent subset of the plurality of nodes that is described by two or more but not all of the plurality of views.

5. The computer-implemented method of claim 1, wherein, for at least one of the plurality of views, the comparison is performed using a respective embedding matrix that comprises separate respective entries for the common embedding set and at least one of the one or more independent embedding sets and wherein, for the at least one of the plurality of views, the respective embedding matrix comprises a first entry for the common embedding set and a second entry for a respective independent subset of the plurality of nodes that are described by only such view.

6. The computer-implemented method of claim 1, wherein updating the view-specific encoder comprises:
   modifying, by the one or more computing devices, one or more parameter values of the view-specific encoder model to reduce the objective function.

7. The computer-implemented method of claim 1, wherein said updating the common embedding set comprises minimizing the objective function.

8. The computer-implemented method of claim 1, further comprising analyzing one or more of the plurality of nodes of the graph network based on the common embedding set and the one or more independent embedding sets.

9. The computer-implemented method of claim 1, wherein the objective function evaluates, for each of the plurality of views, a respective difference between the respective encoded representations of the plurality of nodes obtained for such view and the respective embeddings for the nodes described by such view multiplied by a respective basis matrix for such view.

10. The computer-implemented method of claim 1, wherein the objective function evaluates, for each of the plurality of views, a Frobenius norm of a respective difference between the respective encoded representations of the plurality of nodes obtained for such view and the respective embeddings for the nodes described by such view multiplied by a respective basis matrix for such view.

11. The computer-implemented method of claim 1, wherein the objective function comprises a sum of respective distances evaluated for the plurality of views.

12. The computer-implemented method of claim 1, wherein at least two of the plurality of datasets comprise different respective modalities of data.

13. A first computing system, comprising:
one or more processors; and
one or more non-transitory computer-readable media that collectively store instructions that when executed by the one or more processors cause the computing system to perform operations, the operations comprising:
obtaining a unified embedding for a graph network comprising a plurality of nodes, wherein the unified embedding has been generated from a plurality of datasets that respectively correspond to a plurality of views of the graph network, wherein the plurality of datasets comprise one or more partial view datasets for one or more partial views that comprise data for only a respective subset of the plurality of nodes of the graph network, and wherein the unified embedding comprises:
a common embedding set that contains respective embeddings for common subset of the plurality of nodes that are common among all of plurality of views; and
one or more independent embedding sets that contain respective embeddings for one or more respective independent subsets of the plurality of nodes that are described by only a respective subset of the plurality of views; and
analyzing one or more of the plurality of nodes of the graph network based on the unified embedding;
wherein the unified embedding was generated by:
initializing, by the first computing system or a second computing system comprising one or more computing devices: the common embedding set; the one or more independent embedding sets; and, for each respective view of the plurality of views, a view-specific basis matrix of a plurality of view-specific basis matrices and a view-specific encoder model of a plurality of view-specific encoder models; and
updating the plurality of view-specific encoder models, the plurality of view-specific basis matrices, and the one or more independent embedding sets using a coordinate descent operation, wherein the coordinate descent operation comprises, for each of a plurality of iterations:
processing, by the first or second computing system, each of the plurality of datasets with a corresponding view-specific encoder model of the plurality of view-specific encoder models to obtain, for each of the plurality of datasets, respective encoded representations of the plurality of nodes described by the corresponding view;
updating, by the one or more computing devices for each respective view of the plurality of views, based at least in part on an objective function, the view-specific encoder model;
updating, by the one or more computing devices for each respective view of the plurality of views, based at least in part on the objective function, the view-specific basis matrix;
updating, by the one or more computing devices, based at least in part on the objective function, the common embedding set; and
updating, by the one or more computing devices, based at least in part on the objective function, the one or more respective independent embedding sets;
wherein the objective function comprises a comparison of the respective encoded representations with the respective embeddings, and wherein the objective function further comprises a proximity preservation term that enforces preservation of proximity within each view.

14. The computing system of claim 13, wherein the graph network comprises a social network that describes social connections between entities.

15. The computing system of claim 13, wherein the graph network comprises a logistics network that describes logistical connections between logistical nodes.

16. The computing system of claim 13, wherein the graph network comprises a biological network that describes biological units.

17. The computing system of claim 13, wherein the graph network comprises a chemical network that describes chemical units.

18. The computing system of claim 13, wherein analyzing one or more of the plurality of nodes based on the unified embedding comprises:
using the respective embedding for a first node of the plurality of nodes to:
identify one or more other nodes of the plurality of nodes that are similar to the first node;
classify the first node;
predict a link between the first node and at least one other node of the plurality of nodes;
cluster the first node with the one or more other nodes of the plurality of nodes; or
identify a community to which the first node belongs.

19. The computing system of claim 13, wherein the unified embedding was generated by the second computing system and wherein the second computing system is distinct from the first computing system.

20. The computing system of claim 13, wherein the unified embedding was generated by the first computing system.

* * * * *